(12) United States Patent
Ma et al.

(10) Patent No.: US 8,762,334 B1
(45) Date of Patent: Jun. 24, 2014

(54) DISTRIBUTED NETWORK ANOMALY DETECTION

(75) Inventors: XinZhang Ma, Fremont, CA (US); David Rowell, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/432,324

(22) Filed: Apr. 29, 2009

(51) Int. Cl.
*G06F 7/00* (2006.01)
*G06F 17/00* (2006.01)
*G06F 17/30* (2006.01)

(52) U.S. Cl.
USPC ............................ 707/627; 707/631; 707/769

(58) Field of Classification Search
USPC .......................................... 707/627, 631, 769
See application file for complete search history.

(56) References Cited

U.S. PATENT DOCUMENTS

| 7,768,921 | B2 * | 8/2010 | Nakil et al. ................... 370/235 |
| 7,855,974 | B2 * | 12/2010 | Merkey et al. ................ 370/252 |
| 2003/0135612 | A1 * | 7/2003 | Huntington et al. .......... 709/224 |
| 2008/0101234 | A1 * | 5/2008 | Nakil et al. ................... 370/235 |
| 2010/0195495 | A1 * | 8/2010 | Yeung et al. .................. 370/231 |

* cited by examiner

*Primary Examiner* — Sherief Badawi
*Assistant Examiner* — Christy Lin
(74) *Attorney, Agent, or Firm* — Harrity & Harrity, LLP

(57) ABSTRACT

A network device may include multiple interfaces, each including a local database to store, in a first group of local records, information associated with a first group of data units sent from or received by a first one of the group of interfaces; a global database to store, in a group of global records, information associated with the first group of data units and information associated with a second group of data units sent from or received by a second one of said group of interfaces. The device may include a processor, to manage the local database and the global database; broadcast at least one of the local records to the second one of the group of interfaces; and analyze each of the local records to identify potential anomalies in the first group of data units.

20 Claims, 6 Drawing Sheets

DISTRIBUTED NETWORK ANOMALY DETECTION

BACKGROUND

As computer networks grow in both size and complexity, the need for complex networks to share resources efficiently has increased. Distributed computing environments have been created for this purpose. With the increase in size and complexity of computer networks, the need for, and difficulty of, monitoring data flow within the network has increased. One such area of concern is network security and, particularly, vulnerability to interruption by anomalies. Typically, in order to monitor information related to anomalies within a network device—such as a switch or router—a record in a database may be created each time a data unit associated with a data flow is received and/or sent.

As the amount of data flows that may be transmitted through network devices is quite substantial, the process of updating the database stored in the central location commonly grows too unwieldy to permit efficient access to the central database by elements in the device.

SUMMARY

According to one implementation, a device may include multiple interfaces, each including a local database to store, in a first group of local records, information associated with a first group of data units sent from or received by a first one of the group of interfaces; a global database to store, in a group of global records, information associated with the first group of data units and information associated with a second group of data units sent from or received by a second one of said group of interfaces; and a processor, to manage the local database and the global database; broadcast at least one of the local records to the second one of the group of interfaces; and analyze each of the local records to identify potential anomalies in the first group of data units.

According to another implementation, a method may include storing, in a first one of a group of interface devices, a group of local records in a local database, where each of the group of local records includes information associated with a first data unit sent from or received by the first one of the group of interfaces; and storing, in the first one of the group of interface devices, a group of global records in a global database, where at least one of the group of global records includes information associated with a second data unit sent from or received by a second one of the group of interfaces. The method may include broadcasting the group of local records to the second one of the group of interfaces; and analyzing each of the local records to identify potential anomalies in the data units.

According to a further implementation, a device may include means for storing, in a local database in a first interface device, a group of local records including information associated with a first group of data units sent from or received by the first interface device; means for storing, in a global database, a group of global records including information associated with the first group of data units and information associated with a second group of data units sent from or received by a second interface device; means for receiving a local record from the second interface device; and means for updating the global database with the received local record. The device may further include means for broadcasting the local records to the second interface device; and means for analyzing each of the local records to identify potential anomalies in the first group of data units.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein may use information regarding transmitted and/or received data units to identify potential anomalies regarding data units processed by distributed elements of a network device. For example, transmitted data units may include malicious data, including viruses, Trojans and worms. Other types of potential anomalies include data that may be benign, yet is not structured properly in the transmitted data unit. An increasingly common data anomaly is associated with denial of service (DoS) attacks. When analyzing transmitted data units for potential anomalies, it is thus often helpful to examine the data units for patterns that may be associated with DoS attacks. For example, many data units sent to a single destination may be consistent with a DoS attack. Similarly, many data units received from a single source location may be consistent with a DoS attack. In addition, data units that are sent to destinations which send no reply confirming receipt of the data unit, may be consistent with a DoS attack.

For example, in one implementation, information regarding a received data unit may be stored in an interface device, in a local database containing information associated with transmitted and/or received data units associated with the interface device. In another implementation, information regarding a received data unit may be analyzed, in an interface device, to determine if the data units may include potential anomalies. In yet another implementation, an interface may include a processor, for transmitting and/or receiving data units, for performing analysis to determine if transmitted and/or received data units may include potential anomalies, and for broadcasting information regarding transmitted and/or received data units to multiple interface devices. The term "data unit," as used herein, may refer to a packet, a datagram, or a cell; a fragment of a packet, a datagram or a cell; or another type or arrangement of data. A transmitted and/or received data unit may include metadata. For example, data unit metadata may include information in a data unit header, such as Internet Protocol (IP) addresses, port information, protocol information, etc.

Exemplary Network Device Configuration

Figure 1:
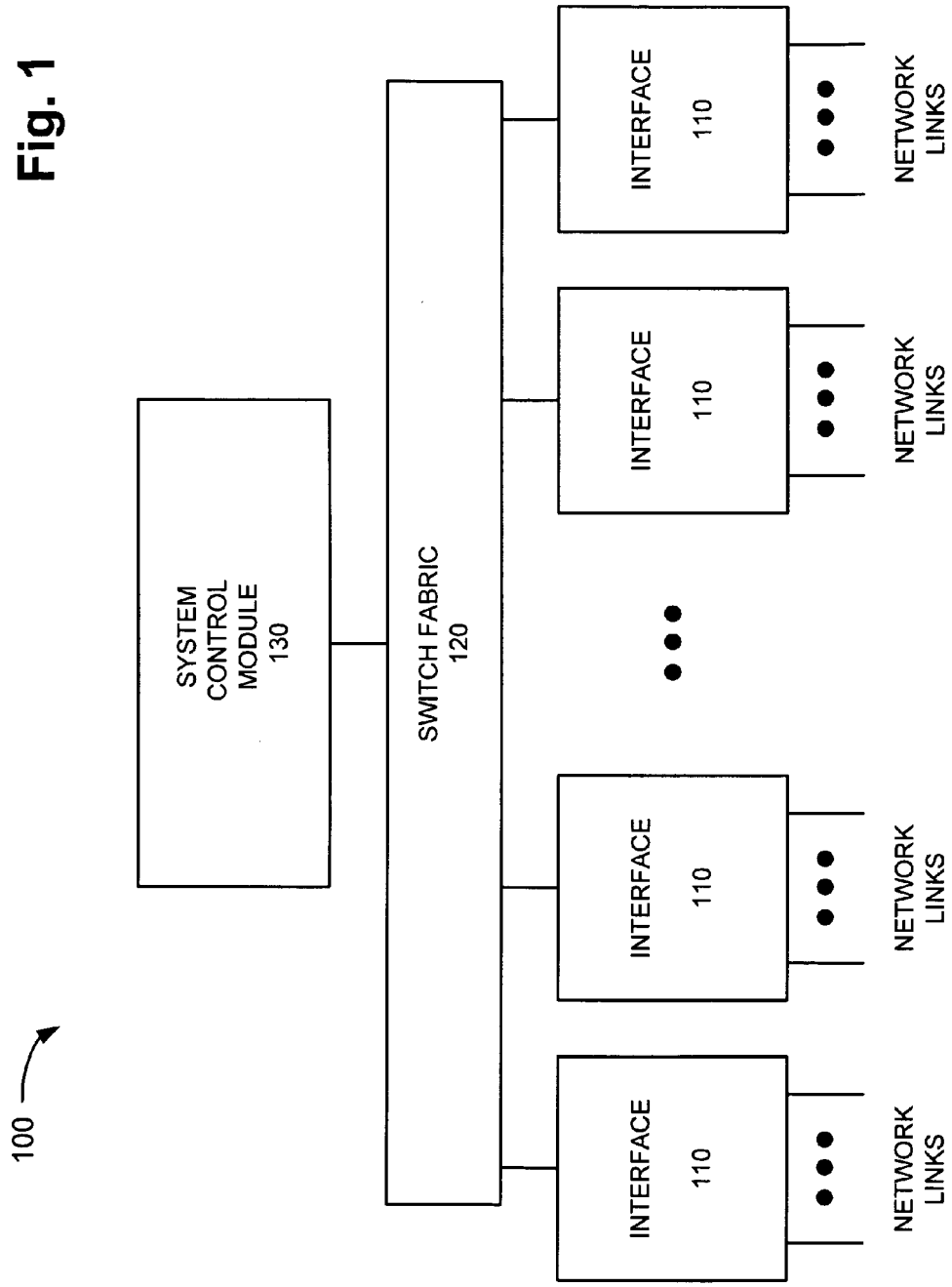
FIG. 1 is a diagram of an exemplary device in which systems and/or methods, described herein, may be implemented.

FIG. 1 is a diagram of an exemplary device 100 in which systems and/or methods, described herein, may be implemented. Device 100 may include any type of network device, such as a router, a switch, or a gateway, that directs or switches incoming data units from multiple input locations to multiple output locations.

As shown, device 100 may include a group of interfaces 110, a switch fabric 120, and a system control module 130. In other implementations, device 100 may include fewer, additional, different, or differently arranged components than those illustrated in FIG. 1.

Interfaces 110 may include devices or assemblies, such as stackable switches, or line cards, for receiving incoming data units from network links (or from other interfaces 110) and for transmitting the data units to network links (or to other interfaces 110). For example, interfaces 110 may include Ethernet interfaces, optical carrier (OC) interfaces, and/or asynchronous transfer mode (ATM) interfaces. Interfaces 110 may manage a set of input ports via which data units can be received and a set of output ports via which data units can be transmitted.

Switch fabric 120 may include one or more switching planes to facilitate communication among interfaces 110 and/or system control module 130. In one implementation, each of the switching planes may include a single or multi-stage switch of crossbar elements. Switch fabric 120 may also, or alternatively, include processors, memories, and/or paths that permit communication among system control module 130 and interfaces 110.

System control module 130 may include one or more processors, microprocessors, application specific integrated circuits (ASICs), field programming gate arrays (FPGAs), and/or processing logic that may be optimized for networking and communications. System control module 130 may perform high level management functions for device 100. For example, system control module 130 may communicate with other networks and systems to exchange information regarding network topology. In some implementations, system control module 130 may include a routing engine for creating routing tables based on network topology information, creating forwarding tables based on the routing tables, and sending these tables to interfaces 110 for data unit routing. System control module 130 may also include a static memory (e.g. a read only memory (ROM)), a dynamic memory (e.g. a random access memory (RAM)), onboard cache, and/or flash memory for storing data and/or machine-readable instructions.

Figure 2:
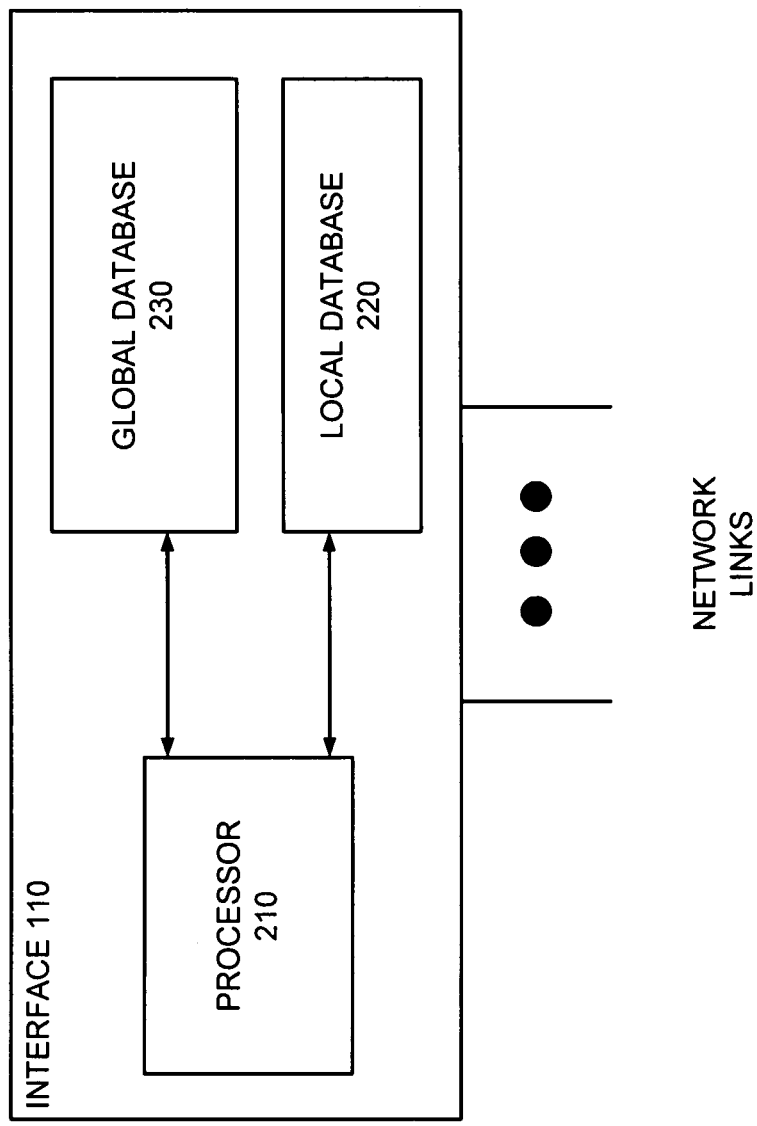
FIG. 2 is a block diagram illustrating exemplary components of an interface of FIG. 1.

FIG. 2 is a block diagram illustrating exemplary components of interface 110. As shown in FIG. 2, interface 110 may include a processor 210, a local database 220, and a global database 230. In other implementations, interface 110 may include fewer, additional, different, or differently arranged components than those illustrated in FIG. 2.

Processor 210 may include hardware, or a combination of hardware and software, that may receive, store, process, and/or forward data units and data unit metadata. For example, processor 210 may process data units received from incoming network links and prepare data units for transmission on outgoing network links. Processor 210 may make forwarding decisions based on header information of the data units. Processor 210 may include a memory to aid in the storing, processing, and/or forwarding of received data units. In one implementation, processor 210 may include an algorithm for creating a local database record, hereinafter referred to as a "local record," for received data units to identify potential anomalies. For example, processor 210 may use metadata included in a data unit header, such as IP addresses, port information, protocol information, etc., to create a local record.

Processor 210 may transmit information related to received and/or sent data units to local database 220. Local database 220 may be implemented within a memory device, such as one or more dynamic RAMs (DRAMs). Processor 210 may also broadcast local records from local database 220 to other interfaces 110 for incorporation and storage in their global databases 230. In one implementation, processor 210 may include a timer function to trigger the broadcasting of local records. In another implementation, processor 210 may include software to measure data traffic, and to adjust the frequency of broadcasting local records accordingly. For example, during periods of high data traffic in network 110, processor 210 may broadcast local data more frequently than during periods of low data traffic.

Processor 210 may also access global database 230 to send and/or receive information regarding data units. Global database 230 may be implemented within a memory device, such as one or more dynamic RAMs (DRAMs). Processor 210 may use information included in a local record, such as IP addresses, port information, protocol information, etc., to update global database 230. In one implementation, processor 210 may include a timer function to trigger the updating of global database 230. Further in this example, processor 210 may receive broadcast local records from other interfaces 110, where the broadcast local records contain information regarding data units transmitted and/or received by other interfaces 110. Processor 210 may update global database 230 with the received broadcasted local records.

Local database 220 may include hardware, or a combination of hardware and software, that may include creating and/or storing one or more local records for storing information related to data units. Local database 220 may receive information from processor 210 and may transmit (back to processor 210) stored data, such as a source IP address, destination IP address, source port information, destination port information, and/or protocol information, from a local record. For example, local database 220 may store a number of local records, where a local record identifies one of a number of data units sent and/or received by interface 110. For example, a local record may contain metadata from a data unit sent or received by interface 110. Details of entries within local database 220 will be described with reference to FIG. 3.

Global database 230 may include hardware, or a combination of hardware and software, that may include creating and/or storing one or more global records for storing information related to data units. Global database 230 may receive information from processor 210 and may transmit (back to processor 210) stored data unit metadata. For example, global database 230 may receive information from processor 210 metadata, such as a source IP address, destination IP address, source port information, destination port information, and/or protocol information, from a local record. In one implementation, global database 230 may receive one or more local records from multiple local databases 220 in multiple interfaces 110. For example, global database 230 may store a number of local records, where each local record may contain data unit metadata from a different local database 220, in a different interface 110. In a further example, there may be local records of sent data units from one interface 110, and local records of received data units from another interface 110.

In one implementation, global database 230 may be an aggregate of multiple local records, from multiple local databases 220, where each entry in global database 230 may be referred to as a "global record." For example, global database 230 may receive a local record from local database 220 via processor 210, and use this information as an address to look up data unit metadata stored within global database 230. The data unit metadata may be transmitted from global database 230 to processor 210 for further processing of a data unit by processor 210 and local database 220 for example. In one implementation, system module 130 may include a copy of global database 230. In this case, processor 210 may transmit global records from global database 230 to system module 130. In another implementation, multiple interfaces 110 may transmit local records from multiple local databases 220 to system control module 130, where the local records may be combined in a copy of global database 230.

Exemplary Components of Local Database

Figure 3:
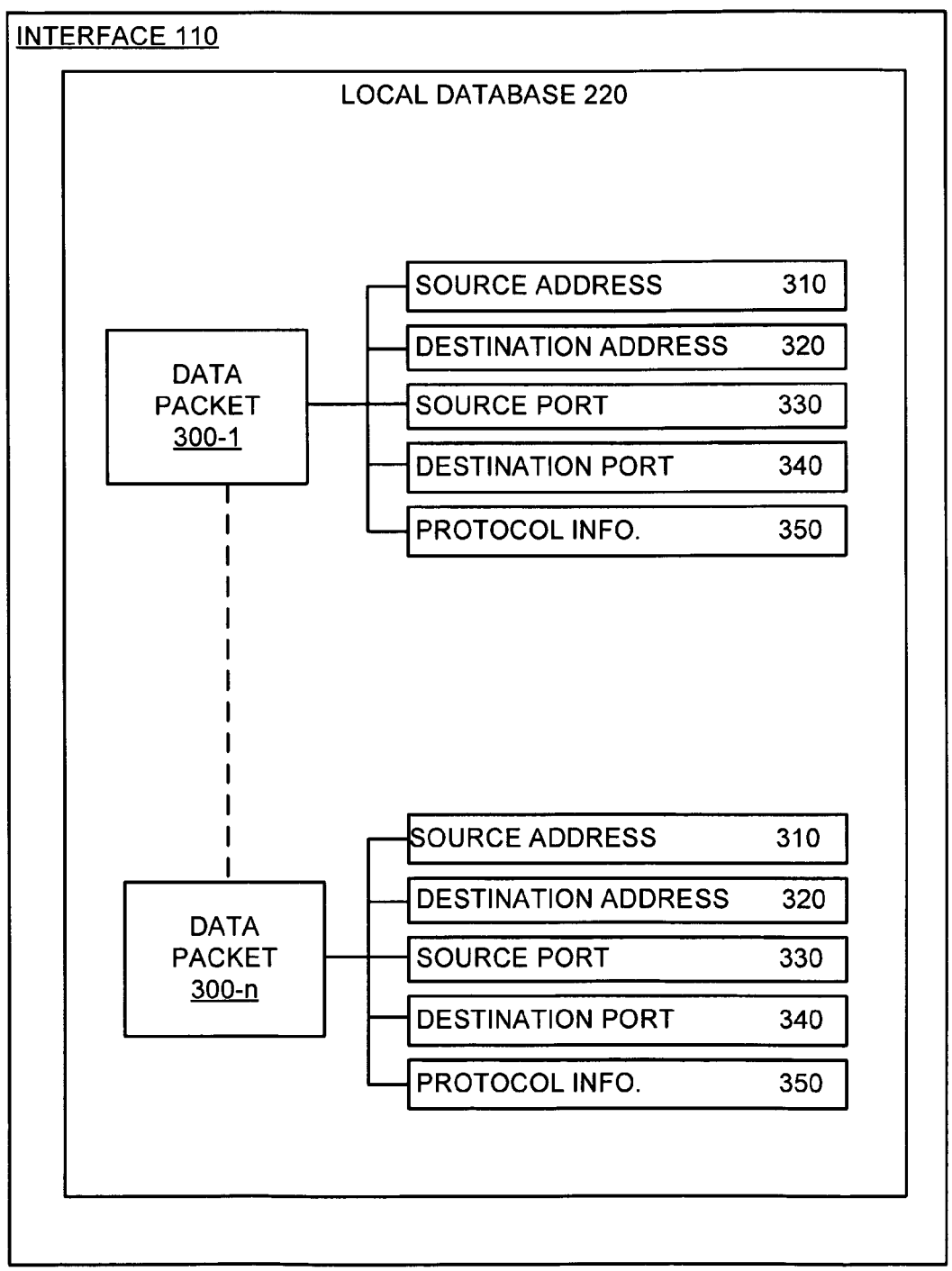
FIG. 3 is a block diagram illustrating exemplary contents of a database in the interface of FIG. 2.

FIG. 3 is a diagram of exemplary fields of a local record in local database 220. As shown in FIG. 2, local database 220 may be a component of interface 110. Further as shown, local database 220 may include a number of local records. Each local record may be associated with one of a number of data units 300-1 through 300-n that have been received or transmitted by interface 110. Each record may include a source IP address field 310, a destination IP address field 320, a source port field 330, a destination port field 340, and a protocol number field 350.

The source IP address field 310 may contain information regarding a source IP address from which the data unit originates. The source IP address may be useful in identifying data anomalies in data units received by interface 110. The destination IP address field 320 may contain information regarding a destination IP address for the data unit. The destination IP address may be useful in identifying data anomalies in data units sent by interface 110. The source port field 330 may contain information for identifying an input port included in interface 110, for example. The destination port field 340 may contain information for indicating a destination port (e.g., port 83 for web server) for the data unit. The protocol information field 350 may contain information for indicating a type of protocol of a data unit.

Exemplary Processes

Figure 4:
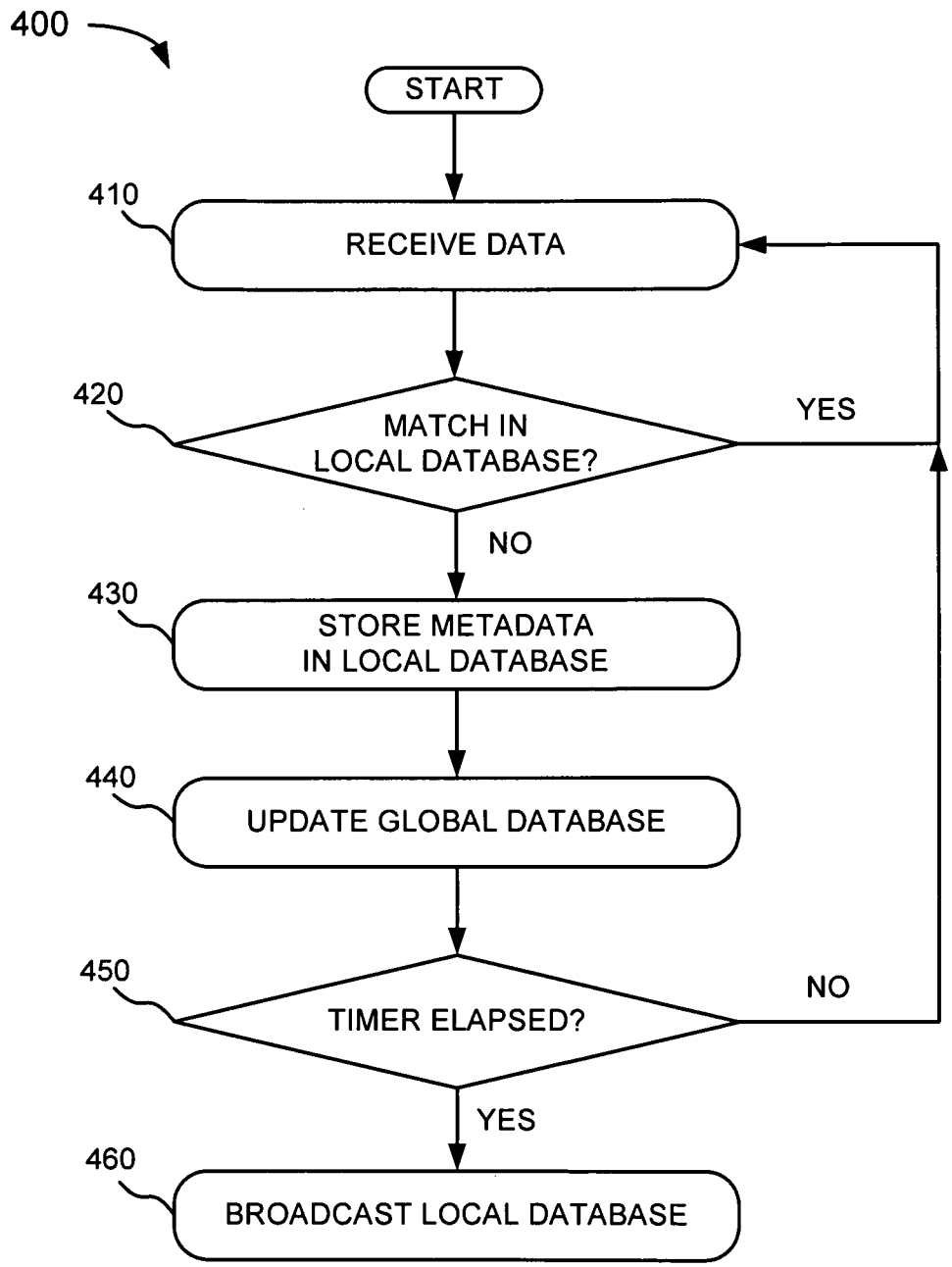
FIG. 4 illustrates a flowchart of an exemplary process for managing data unit metadata and records in the database of FIG. 3.

FIG. 4 illustrates a flowchart of an exemplary process 400 for managing data unit metadata and records in the database of FIG. 3. In one implementation, processor 210 may perform process 400 substantially simultaneously with processing data units. Process 400 may begin when processor 210 receives a data unit (block 410). For example, processor 210 may receive a data unit in network interface 110, as shown in FIG. 2. Processor 210 may use metadata included in the received data unit (e.g., information in a data unit header, such as Internet Protocol (IP) addresses, port information, protocol information, etc.) to determine if there is matching metadata in local database 220 (block 420). In one implementation, processor 210 may search local database 220 for a local record including a match of the source IP of the received data unit. For example, in device 100, it may be important to validate or verify the source IP of a received data unit, to identify data anomalies. As an example, a received data unit from a specific source IP address may contain corrupt, irrelevant, or malicious data. In such a case, the source IP address of the received data unit may indicate a source of data anomalies. When processor 210 finds a matching source IP in local database 220, processor 210 may return to block 410 in process 400 (Yes—in block 420), without storing information in local database 220.

When processor 210 finds no matching data unit metadata in local database 220 (No—in block 420), processor 210 may store the data unit metadata in local database 220 (block 430). In one implementation, the metadata may be stored as a local record, as described with respect to FIG. 3. For example, source IP address and destination IP address may be useful in identifying anomalies in received data units, and thus may be stored, along with other data unit metadata, in local database 220. As an example, a received data unit with a specific destination IP address may contain corrupt, irrelevant, or malicious data. In such a case, the destination IP address of the received data unit may be helpful in identifying data anomalies.

Continuing with this example, processor 210 may update global database 230 (block 430). In one implementation, processor 210 may update global database 230 with metadata stored as a local record in database 220. For example, global database 230 may store aggregated data unit metadata not only from local database 220, but also from local databases 220 in other interfaces 110.

Processor 210 may determine if a timer function has elapsed (block 450), in order to trigger the broadcast of local records in local database 220. When processor 210 determines that the timer function has not elapsed, processor 210 may return to block 410 in process 400 (No—in block 450), without broadcasting local records. Alternatively, when processor 210 determines that a timer function has elapsed (Yes—in block 450), processor 210 may broadcast local records from local database 220 (block 460). In one implementation, processor 210 may broadcast local records from local database 220 to multiple interfaces 110 in device 100. For example, local records broadcast from interface 110 to other interfaces 110 may be used to create a global database 230 in each interface 110 to which local records are broadcast.

Figure 5:
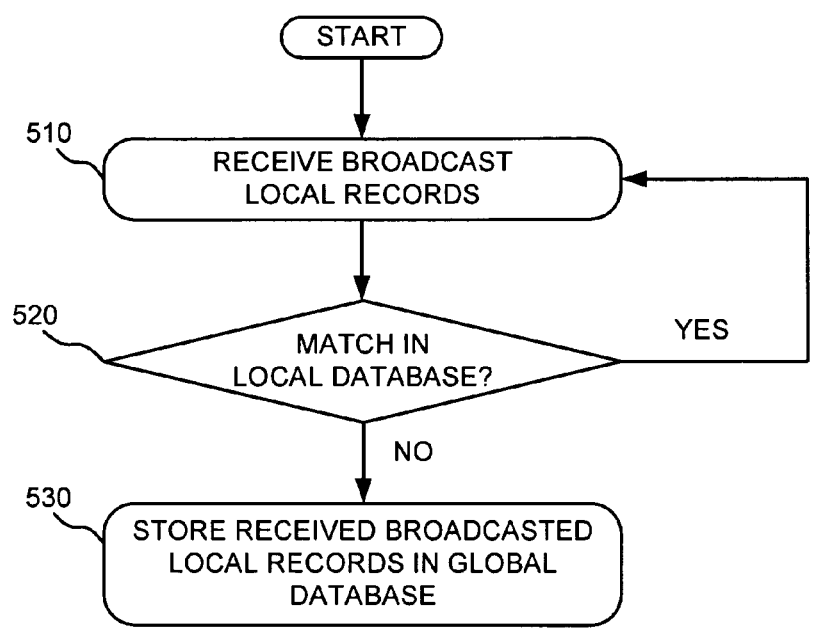
FIG. 5 illustrates a flowchart of an exemplary process for managing records in the database of FIG. 3.

FIG. 5 illustrates a flowchart of an exemplary process 500 for managing records in global database 230. In one implementation, processor 210 may perform process 500 substantially simultaneously with processing data units and data unit metadata. Process 500 may begin when processor 210 receives broadcast local records (block 510). For example, processor 210 may receive broadcast local records from local databases 220 in other interfaces 110 of device 100. Processor 210 may use individual fields included in the received broadcasted local records to determine if there is matching data in local database 220 (block 520). In one implementation, processor 210 may search local database 220 for each received broadcasted local record. For example, in device 100, multiple interfaces 110 may receive data units with matching data unit metadata. As an example, in a network, different interfaces may receive identical data units at different times. As a further example, different interfaces may receive multiple data units with identical metadata (e.g., information in a data unit header, such as Internet Protocol (IP) addresses, port information, protocol information, etc.). In that case, as described with respect to FIG. 4, each of the affected interfaces 110 would store matching metadata in the local database 220 of the respective interface 110. Further in this case, local records created from identical data units would duplicate each other. Similarly, local records created from data units having identical metadata would also duplicate each other, and storing duplicate local records may not offer any advantage in monitoring data anomalies in a network including device 100.

Continuing with this example, when processor 210 finds a matching local record in local database 220, processor 210 may return to block 510 of process 500 (Yes—in block 520), without storing information in global database 230. When processor 210 finds no matching local record in local database 220 (No—in block 520), processor 210 may store the broadcast local record in global database 230 (block 530).

Figure 6:
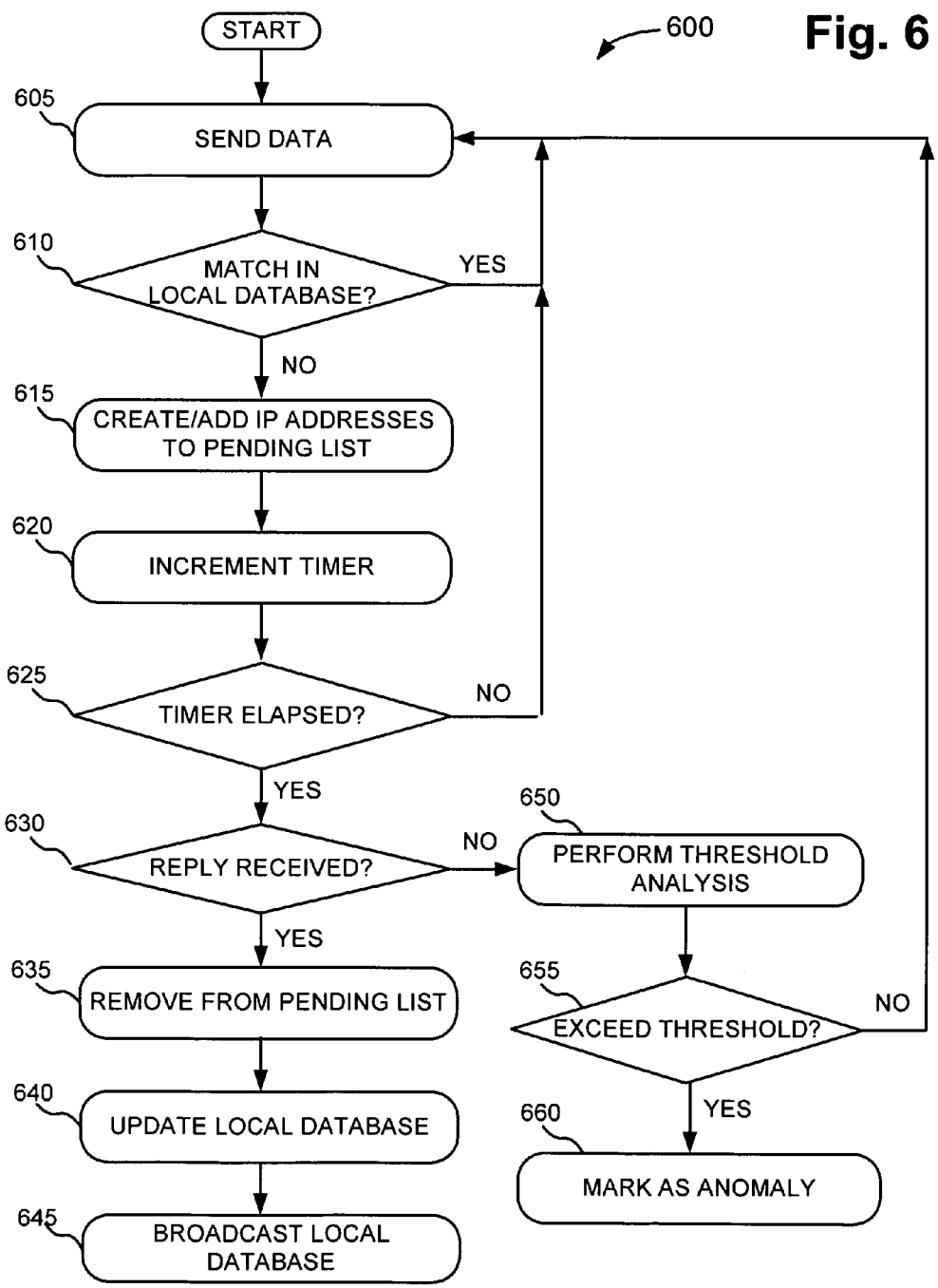
FIG. 6 illustrates a flowchart of an exemplary process for managing potential anomalies in the network device of FIG. 1.

FIG. 6 illustrates a flowchart of an exemplary process 600 for managing potential anomalies in the network device of FIG. 1. Process 600 may begin when processor 210 sends a data unit including the data unit metadata (block 605). For example, processor 210 may send a data unit to an IP destination address included in the data unit metadata. Processor 210 may use metadata included in the sent data unit to determine if there is matching metadata in local database 220 (block 610).

In one implementation, processor 210 may search local database 220 for a local record including a match of the destination IP address of the sent data unit. For example, in device 100, it may be important to validate or verify the destination IP address of a sent data unit, to identify potential data anomalies. As an example, a sent data unit may include a specific destination IP address that may be incorrect or inoperative. In such a case, the destination IP address of the sent data unit may indicate a destination IP address associated with data anomalies. In this example, when processor 210 finds a matching destination IP address in local database 220, processor 210 may return to block 605 of process 600 (Yes—in block 610), without taking any further action, including storing information in local database 220.

When processor 210 finds no matching data unit metadata in local database 220 (No—in block 610), processor 210 may create an entry for a pending list of IP addresses linked to sent data units (block 615). In one implementation, a pending list may be managed as a linked list. For example, an entry for a pending list may include a source IP address and a destination IP address for each sent data unit. Further in this example, a pending list of IP addresses linked to sent data units may include a hash table. After processor 210 creates and adds an entry in a pending list, processor 210 may increment a timer (block 620). In one implementation, the timer may operate as a counting wheel, where each data unit sent operates to advance the counting wheel by specific value. For example, a counting wheel may be operated such that after a specific total incremental value has advanced, the counting wheel initiates a subsequent action.

Processor 210 may determine if a timer function has elapsed (block 625), in order to monitor the entries in the pending list (block 625). When processor 210 determines that the timer function has not elapsed, processor 210 may return to block 605 of process 600 (No—in block 625), without taking any further action. Alternatively, when processor 210 determines that a timer function has elapsed (Yes—in block 625), processor 210 may determine if a reply has been received from the IP address in the pending list entry (block 630). For example, it may be important to validate or verify the source IP and/or destination IP of a sent data unit, to identify data anomalies. In this example, when processor 210 receives a reply to a data unit with an entry in the pending list (Yes—in block 630), processor 210 may remove the entry from the pending list (block 635), since the successful reply may indicate that the sent data unit may not be associated with a data anomaly.

Processor 210 may then update local database 220 (block 640). In one implementation, processor 210 may create a local record for the sent data unit, as described with reference to FIG. 3. For example, source IP address and destination IP address of sent data units with received replies may be useful in identifying anomalies in received data units. Thus, processor 210 may store source IP address and destination IP address, along with other data unit metadata, in local database 220. Processor 210 may broadcast local records from local database 220 (block 645). In one implementation, processor may broadcast local records from local database 220 to multiple interfaces 110 in device 100.

Alternatively, after the timer has elapsed (Yes—in block 625), if processor 210 receives no reply to a sent data unit with an entry in the pending list (No—in block 630), processor 210 may perform a threshold analysis to determine the potential anomaly status of the sent data unit (block 650). In one implementation, the analysis may include a threshold random walk (TRW) algorithm. For example, a TRW algorithm may be performed on metadata linked to a sent data unit with no reply, in order to determine the likelihood that the source IP address and/or destination IP address linked with the data unit is an anomaly, such as a malicious host. Further in the example, a threshold value for the TRW algorithm may be varied. In one implementation, variation of a threshold value for the TRW algorithm may be linked to data traffic. For example, during periods of high data traffic in network device 110, processor 210 may set a threshold value for the TRW algorithm that differs from a threshold value for the TRW algorithm during periods of low data traffic.

Continuing with this example, using the operation of the threshold analysis, processor 210 may determine if a threshold value is exceeded (block 655). For example, it may be important to limit the number of times that a data unit is sent with no reply, as calculated by the threshold analysis. Conversely, it may be advantageous to permit a certain number of attempts to send data units without receiving replies, such as to anticipate and/or compensate for results that are not treated as data unit anomalies. For example, transmission errors and/or software and hardware errors may account for a lack of reply to a sent data unit. Thus, if processor 210 determines that a threshold value has not been exceeded (No—in block 655), processor 210 may return to block 605 of process 600, without taking any further action. Alternatively, when processor 210 determines that a threshold value has been exceeded (Yes—in block 655), processor 210 may mark as an anomaly the data unit and/or the metadata included in the data unit.

CONCLUSION

Implementations, described herein, may use a processor to manage a local database that includes information and statistics related to data units sent and received from a network interface. Using the system and methods described above, the number of records within a local database may be efficiently updated and managed. For example, data unit metadata, such as that header data which may be used to track potential anomalies, may be tracked within the interface, so as not to overwhelm the network including the network device disclosed herein. Additionally, implementations described herein may use a processor to manage a global database that includes information related to information and statistics of data units sent and received from multiple network interfaces within the network including the network device disclosed herein.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4, 5, and 6, the order of the blocks may be modified in other implementations. Further, non-dependent blocks may be performed in parallel.

Further, databases and database records have been described. The term "database," as used herein, may refer to any searchable form or arrangement of data within a memory.

It will be apparent that aspects described herein may be implemented in many different forms of software, firmware, and hardware in the implementations illustrated in the figures. The actual software code or specialized control hardware used to implement these aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device comprising:
    a plurality of interfaces, each interface comprising:
        a local database to store, in a first plurality of local records, information associated with a plurality of data units sent from or received by the interface; and
        a processor to:
            send at least one of the plurality of data units to a destination address;
            determine if information contained in the at least one of the plurality of data units matches information stored in the local database;
            create, when the information contained in the at least one of the plurality of data units does not match the information stored in the local database, an entry in the local database,
                the entry including:
                    a source address associated with a respective data unit of the at least one of the plurality of data units, and
                    a destination address associated with the respective data unit;
            determine, when the information contained in the at least one of the plurality of data units does not match the information stored in the local database, if the processor receives a reply from the destination address;
            increment a timer by a particular value,
                the timer acting as a counting wheel and being incremented by the particular value after each data unit, of the plurality of data units, is sent to the destination address;
            determine, when the incremented timer elapses, if the processor receives a reply from the destination address;
            update, when the processor receives the reply from the destination address, the information stored in the local database,
                the processor, when updating the information stored in the local database being to:
                    remove the entry; and
                    create a record associated with the respective data unit,
                    the record including:
                        the source address, and
                        the destination address;
            broadcast, based on updating the local database and when the incremented timer elapses, the information stored in the local database to one or more other interfaces of the plurality of interfaces;
            process, when the processor does not receive a reply from the destination address, the at least one of the plurality of data units sent to the destination address to obtain a threshold value; and
            mark the at least one of the plurality of data units as an anomaly when the threshold value exceeds a threshold.

2. The device of claim 1, where one of the first plurality of local records includes:
    a source address associated with the at least one of the plurality of data units;
    a destination address associated with the at least the one of the plurality of data units;
    a source port associated with the at least the one of the plurality of data units; and
    a destination port associated with the at least the one of the plurality of data units.

3. The device of claim 1, where each interface, of the plurality of interfaces, further comprises:
    a global database to store information associated with the plurality of data units stored in the local database and the broadcast information that is broadcast to the one or more other plurality of interfaces.

4. The device of claim 3, where each interface, of the plurality of interfaces, is to receive information from the one or more other interfaces and stores the received information in the global database.

5. The device of claim 4, where each interface, of the plurality of interfaces, is further to:
    compare the information from the one or more other interfaces to the information stored in the local database;
    determine if the information from the one or more other interfaces is stored in the local database; and
    store, in the global database, the information from the one or more other interfaces that is not stored in the local database.

6. The device of claim 1, where the processor is further to:
    create, based on determining that the information contained in the at least one of the plurality of data units does not match the information stored in the local database, an entry for a pending list of one or more addresses linked to the at least one of the plurality of data units.

7. A method comprising:
    storing, in a first device of a plurality of devices, a first plurality of local records in a local database, each of the first plurality of local records including information associated with a plurality of data units sent from or received by a first interface of the first device;

sending, by the first device, the plurality of data units to a destination address;

determining, by the first device, if information contained in the plurality of data units matches information stored in the local database;

creating, by the first device and when the information contained in at least one of the plurality of data units does not match the information stored in the local database, an entry in the local database,
the entry including:
a source address associated with a respective data unit of the at least one of the plurality of data units, and
a destination address associated with the respective data unit;

determining, by the first device and when the information contained in the plurality of data units does not match the information stored in the local database, if a reply is received from the destination address;

incrementing, by the first device, a timer by a particular value,
the timer acting as a counting wheel and being incremented by the particular value after each data unit, of the plurality of data units, is sent to the destination address;

determining, by the first device and when the incremented timer elapses, if the processor receives a reply from the destination address;

updating, by the first device and when the reply is received from the destination address, the information stored in the local database,
when updating the information stored in the local database the method includes:
removing the entry; and
creating a record associated with the respective data unit,
the record including:
the source address, and
the destination address;

broadcasting, by the first device and based on updating the information stored in the local database and when the incremented timer elapses, the information stored in the local database to one or more other interfaces of the first device;

processing, by the first device and when a reply is not received from the destination address, the data unit sent to the destination address to obtain a threshold value; and marking, by the first device, the data unit as an anomaly when the threshold value exceeds a threshold.

8. The method of claim 7, further comprising:
receiving, by the first device, a second plurality of local records from the one or more other interface devices; and
storing, by the first device, the second plurality of local records in a global database.

9. The method of claim 7, further comprising:
creating, by the first device and based on determining that the information contained in the at least one of the plurality of data units does not match the information stored in the local database, an entry for a pending list of one or more addresses linked to the at least one of the plurality of data units.

10. The method of claim 7, further comprising:
receiving, by the first device, another data unit;
comparing, by the first device, information associated with the other data unit to the first plurality of local records; and
storing, by the first device, the information associated with the other data unit as a local record in the local database when the information associated with the other data unit is not in the first plurality of local records.

11. The method of claim 10, further comprising:
storing, by the first device, the information associated with the other data unit as a global record in a global database.

12. The method of claim 7, further comprising:
receiving, by the first device, another data unit;
storing, by the first device, information associated with the other data unit as a global record in a global database;
determining, by the first device, if the information associated with the other data unit is stored in the first plurality of local records; and
deleting, by the first device and when the information associated with the other data unit is stored in the first plurality of local records, the information from the first plurality of local records.

13. The method of claim 7, further comprising:
receiving, by the first device, a second plurality of local records from a second local database; and
storing, by the first device, the second plurality of local records in a global database.

14. The method of claim 13, further comprising:
comparing, by the first device, the second plurality of local records to the first plurality of local records in the local database; and
storing, by the first device and in a global database, the second plurality of local records that are not in the local database.

15. The method of claim 14, further comprising:
comparing, by the first device, the second plurality of local records to global records; and
deleting, by the first device, the second plurality of local records that are stored in the global database.

16. A non-transitory computer-readable memory device storing instructions, the instructions comprising:
one or more instructions which, when executed by a device, cause the device to store, in a local database, information associated with a plurality of data units sent from or received by a first interface of a plurality of interfaces;
one or more instructions which, when executed by the device, cause the device to send at least one data unit of the plurality of data units to a destination address;
one or more instructions which, when executed by the device, cause the device to determine if information contained in the at least one data unit matches information stored in the local database;
one or more instructions which, when executed by the device, cause the device to create, when the information contained in the at least one of the plurality of data units does not match the information stored in the local database, an entry in the local database,
the entry including:
a source address associated with a respective data unit of the at least one of the plurality of data units, and
a destination address associated with the respective data unit;
one or more instructions which, when executed by the device, cause the device to determine, when the information contained in the at least one data unit does not match the information stored in the local database, if a reply is received from the destination address;

one or more instructions which, when executed by the device, cause the device to increment a timer by a particular value,
    the timer acting as a counting wheel and being incremented by the particular value after each data unit, of the plurality of data units, is sent to the destination address;
one or more instructions which, when executed by the device, cause the device to determine, when the incremented timer elapses, if the device receives a reply from the destination address;
one or more instructions which, when executed by the device, cause the device to update, when the reply is received from the destination address, the information stored in the local database,
    the one or more instructions to update the information stored in the local database including:
        one or more instructions to remove the entry; and
        one or more instructions to create a record associated with the respective data unit,
            the record including:
                the source address, and
                the destination address;
one or more instructions which, when executed by the device, cause the device to broadcast, based on updating the local database and when the incremented timer elapses, the information stored in the local database to one or more other interfaces of the plurality of interfaces;
one or more instructions which, when executed by the device, cause the device to process, when a reply is not received from the destination address, the at least one data unit to obtain a threshold value; and
one or more instructions which, when executed by the device, cause the device to mark the at least one data unit as an anomaly when the threshold value exceeds a threshold.

17. The computer-readable memory device of claim 16, further comprising:
    one or more instructions to store, in a global database, information associated with the plurality of data units stored in the local database and the broadcast information that is broadcast to the one or more other interfaces.

18. The computer-readable memory device of claim 17, where each interface, of the plurality of interfaces, receives information from the one or more other interfaces and stores the received information in the global database.

19. The computer-readable memory device of claim 18, further comprising:
    one or more instructions to compare the information from the one or more other interfaces to the information stored in the local database;
    one or more instructions to determine if the information from the one or more other interfaces is stored in the local database; and
    one or more instructions to store, in the global database, the information from the one or more other interfaces that is not stored in the local database.

20. The computer-readable memory device of claim 16, further comprising;
    one or more instructions to create, based on determining that the information contained in the at least one data unit does not match the information stored in the local database, an entry for a pending list of one or more addresses linked to the at least one data unit.

* * * * *